R. S. SHERWIN.
APPARATUS FOR PRODUCING ALUMINUM OXID.
APPLICATION FILED OCT. 20, 1917. RENEWED NOV. 23, 1918.
1,314,709. Patented Sept. 2, 1919.
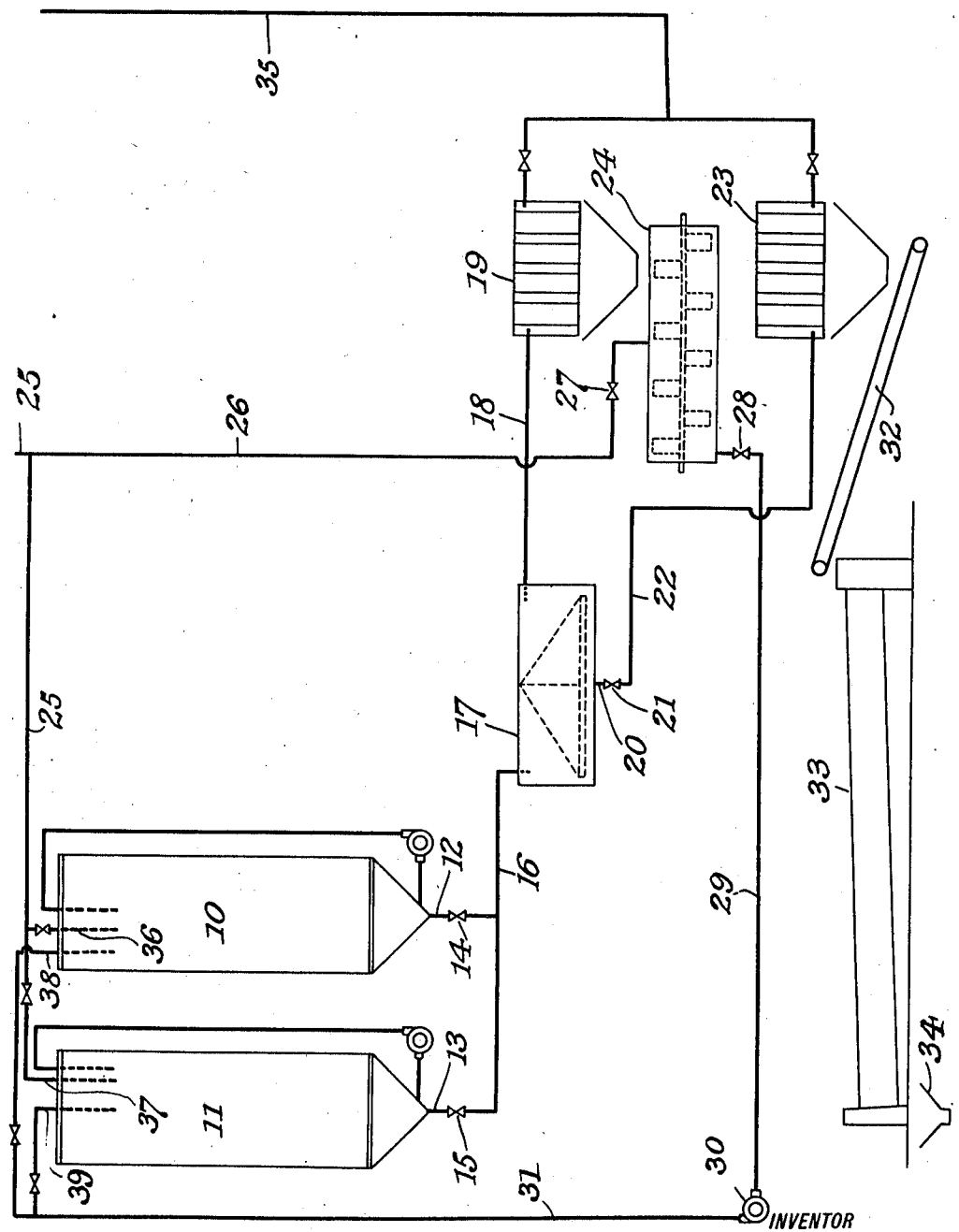

UNITED STATES PATENT OFFICE.

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

APPARATUS FOR PRODUCING ALUMINUM OXID.

1,314,709. Specification of Letters Patent. Patented Sept. 2, 1919.

Application filed October 20, 1917, Serial No. 197,594. Renewed November 23, 1918. Serial No. 263,939.

*To all whom it may concern:*

Be it known that I, RALPH S. SHERWIN, a citizen of the United States, residing at East St. Louis, county of St. Clair, and State of Illinois, have invented certain new and useful Improvements in Apparatus for Producing Aluminum Oxid, of which the following is a full, clear, and exact description.

According to present practice the production of aluminum oxid from bauxite consists essentially in dissolving the aluminum in caustic soda and precipitating it from the solution by contact with freshly precipitated aluminum hydrate.

My invention, which constitutes the subject matter of this application, relates to an improved means which not only facilitates the precipitation of aluminum hydrate but results in the production of particles or grains of hydrate which are uniformly coarse. The precipitate, produced by the methods now in vogue, consists largely and sometimes wholly of very fine particles. The large proportion of fine particles not only makes the precipitate difficult to filter and wash but also causes the loss of a considerable portion of the aluminum oxid as a fine dust during the calcination and subsequent handling and makes conditions quite disagreeable for the workers employed in calcining and handling it. My invention, forming the subject of this application, therefore relates to improvements in mechanism for the manufacture of aluminum oxid designed to overcome the difficulties just referred to.

Referring to the drawing, which illustrates more or less diagrammatically the preferred form and arrangement of apparatus for overcoming the difficulties above referred to, the reference numerals 10 and 11 designate two precipitating tanks of the form now in vogue, provided with outlets 12 and 13, having suitable valves 14 and 15 respectively. The aluminate solution in the precipitator tanks is circulated, carrying aluminum hydrate in suspension, in the manner described in the Fickes Patent No. 13,668, reissued Jan. 6, 1914, and in the manner described in my copending application, Serial No. 779,327, filed July 16, 1913 (now U. S. Patent No. 1,251,296, December 25, 1917). When the precipitation, say in tank 10, is as nearly complete as is practicable commercially the solution with the precipitated aluminum hydrate is drawn out through the valve 14 and the pipe line 16 into a continuous settling tank 17, similar among others to the device known as the Dorr thickener. As a portion of the precipitated aluminum hydrate is too fine to settle readily in the thickener the overflow therefrom is not clear but contains the finer portion of the precipitate. The finer portion, amounting perhaps to ten per cent. (10%) of the precipitated aluminum hydrate, together with the main portion of the solution, amounting perhaps to ninety per cent. (90%) of the total solution, passes through the upper outlet of the tank 17, through the pipe line 18, to any suitable form of filter or filter press 19. The coarser portion of the precipitated aluminum hydrate, amounting perhaps to ninety per cent. (90%) of the whole precipitate, together with the smaller portion of the solution amounting to ten per cent. (10%) or less of the total, passes out through the outlet 20 of the settling tank, through valve 21 and pipe line 22 to a filter 23. Other suitable means of separating the aluminum hydrate from solution leaving the thickener 17, may be used, for example a series of additional thickeners, such a modification being embraced within the scope of my copending application Serial No. 305,261 filed June 20, 1919.

When a sufficient amount of the fine portion of the precipitate is collected in the filter 19, filtration is stopped and the filter cake, consisting of fine aluminum hydrate, is dropped into a tank 24, containing any suitable form of agitator. Fresh sodium aluminate solution is introduced into the tank 24 through the pipe 25, branch pipe 26 and valve 27. The liquor and fine aluminum hydrate are then mixed by means of suitable agitators or paddles so as to hold the fine aluminum hydrate particles in suspension. After sufficient agitation the mixture is drawn through the valve 28, the pipe line 29, pump 30 and pipe 31 and forced by the pump into the precipitator tank 10, or any other precipitator tank in the group, which contains fresh sodium aluminate liquor from which aluminum hydrate is to be precipitated.

The coarse portion of the precipitated aluminum hydrate in the filter 23 is washed and dropped into a suitable conveyer 32, which carries it to a rotary kiln 33, in which it is heated to drive off the combined water and from which it is dropped into a hopper 34 and conveyed to any suitable point. The solution passed through the filter 19 is mixed in the pipe 35 with the solution passed through the filter 23. From the pipe 35 the solution is returned to the digesters and again saturated with the aluminum hydrate in solution.

The pipe 25 is the main filling line for the supply of liquor saturated with aluminum hydrate in solution to the tanks 10 and 11, and the numerals 36 and 37 designate branch pipes for discharging this liquor into tanks 10 and 11, respectively. The pipe 31 is likewise provided with branch pipes 38 and 39. For the sake of brevity and clearness I have illustrated the parts diagrammatically and have shown the invention in use with two precipitators. It is to be understood, however, that any number of precipitating tanks may be employed in connection with a single thickener and with any suitable number of filters. The thickener, of course, should be of a capacity suitable for the number of precipitators with which it is connected, and the capacity of the filters should be suitable for the number of precipitators in the system.

As clearly described in his patent above referred to, Fickes discovered that the precipitation of aluminum hydrate is due to the presence of the precipitate in the form of hydrate particles in suspension in the aluminate liquor, thereby exploding the commonly accepted notion or theory that the precipitation of aluminum hydrate was effected by agitation, more or less violent. In practising his method in the preferred manner, the necessary suspension of the particles in the liquor is effected by frequently or continuously withdrawing the precipitate from the bottom of the tank in which the precipitation occurs and delivering it to the liquor at or near the top. In this way all portions of the liquor are made to contain sufficient hydrate in the form of small particles to maintain the precipitation at an effective rate. In the precipitation of aluminum hydrate in this fashion, no mechanism, as far as I am aware, has been devised to separate the particles or grains of different size. If any separation does accidentally occur in the older forms of apparatus a larger proportion of the coarser material is returned to the precipitators leaving the finer material to be washed and calcined. I have ascertained, however, that by introducing into the liquor only the finer particles of aluminum hydrate to start precipitation the necessary suspension of the particles is more easily maintained; and an additional advantage flowing from this construction is the fact that it enables the finer particles or grains of aluminum hydrate to increase in size so that little or no dust will be formed during calcination to produce the oxid. And the manufacture of aluminum from an oxid containing little or no dust is very desirable since it requires less power to produce the same amount of aluminum than when using aluminum oxid containing a large proportion of fine particles.

It is to be clearly understood that the device illustrated and described herein is merely the preferred embodiment of my invention; and that many changes may be made in point of detail and other embodiments resorted to without deviating from the true spirit and scope of my invention.

The process described herein is claimed in a co-pending application 197,593, filed October 20, 1917 (renewed December 7, 1918, Serial No. 265,788).

What I claim as my invention is:

1. An apparatus for obtaining aluminum hydroxid from an alkali metal aluminate solution comprising means for precipitating aluminum hydrate, in combination with means for separating the finer particles from the coarser particles of hydrate, and means for returning the finer particles to fresh portions of the aluminate solution.

2. In an apparatus for obtaining aluminum hydroxid from an alkali metal aluminate solution, means for precipitating aluminum hydrate from an alkali metal aluminate solution, in combination with means for separating the finer from the coarser particles of hydrate and returning the finer particles to fresh portions of the aluminate solution.

3. In an apparatus for obtaining aluminum hydroxid from an alkali metal aluminate solution, means for precipitating aluminum hydrate from an alkali metal aluminate solution, in combination with means for withdrawing the solution with the precipitated aluminum hydrate from the aforesaid means, and means for separating the finer from the coarser particles of aluminum hydrate comprising a classifying tank, means for withdrawing the finer particles together with a quantity of the solution from one portion of said tank, means for separating said fine particles from said solution, and means for returning said finer particles to fresh portions of the aluminate solution.

4. An apparatus to precipitate aluminum hydrate from an alkali metal aluminate solution and returning only the finer portions thereof to fresh portions of aluminate liquor comprising a precipitating means, means connected to said precipitating means for receiving the solution and precipitated aluminum hydrate therefrom and for classifying the aluminum hydrate particles, means for withdrawing the finer particles together with a portion of the solution from said classifier and filtering the same, and means located in proximity to said filter for receiving the finer particles and returning the same to fresh portions of the aluminate solution.

5. An apparatus employed in connection with the manufacture of aluminum hydrate from an alkali metal aluminate solution comprising means for precipitating aluminum hydrate from an alkali metal aluminate solution, means connected to the aforesaid means for classifying the finer from the coarser particles of precipitated aluminum hydrate, means for receiving and separating said finer particles from the solution, means for receiving and separating said coarser particles from the solution, means adapted to return said finer particles to fresh portions of aluminate solution, means for conveying said coarser particles from the separator to a kiln or other suitable point, and means for conveying the combined clear solution to a digester or to any other suitable point.

6. An apparatus for obtaining aluminum hydroxid from an alkali metal aluminate solution comprising means for separating the finer from the coarser particles of already precipitated aluminum hydrate, and means connected to the aforesaid means for introducing the finer particles into a column of fresh aluminate solution to start precipitation, in combination with means for precipitating said solution in the usual way.

7. An apparatus for obtaining aluminum hydroxid from an alkali metal aluminate solution comprising means for precipitating aluminum hydrate, and means connected to the aforesaid means for segregating the finer from the coarser particles, in combination with means for introducing the finer particles into fresh portions of the aluminate solution to induce precipitation therein.

8. An apparatus for the continuous production of uniformly coarse grains of aluminum oxid from sodium aluminate liquor comprising means for precipitating aluminum hydrate, means connected to the aforesaid means for segregating the finer from the coarser particles, and means connected to the second mentioned means for returning said finer particles to fresh portions of sodium aluminate liquor.

9. An apparatus for the continuous production of uniformly coarse grains of aluminum oxid comprising a tank for containing the liquor to be precipitated, and means connected to said tank adapted to receive the precipitate and solution therefrom and to segregate the finer from the coarser particles of the precipitate, in combination with means adapted to return said finer particles to the upper end of the column of fresh liquor in said tank to start precipitation, and means to continue the precipitation in the ordinary way.

In testimony whereof I hereunto affix my signature.

RALPH S. SHERWIN.